United States Patent [19] [11] 4,283,934
Siess [45] Aug. 18, 1981

[54] PYROMETRIC TEMPERATURE MEASUREMENTS IN FLAMELESS ATOMIC ABSORPTION SPECTROSCOPY

[75] Inventor: Gerhard Siess, Owingen, Fed. Rep. of Germany

[73] Assignee: Bodenseewerk Perkin-Elmer, Uberlingen, Fed. Rep. of Germany

[21] Appl. No.: 92,247

[22] Filed: Nov. 7, 1979

[30] Foreign Application Priority Data

Jan. 29, 1979 [DE] Fed. Rep. of Germany ....... 2903328

[51] Int. Cl.³ .................... G01K 15/00; G01J 5/08
[52] U.S. Cl. .............................. 73/1 F; 73/355 EM
[58] Field of Search ............ 73/1 F, 355 EM; 356/43, 356/45

[56] References Cited

U.S. PATENT DOCUMENTS 4,198,849  4/1980  Siess et al. ............................ 73/1 F

OTHER PUBLICATIONS

Journal of the Optical Society of America, vol. 35, No. 11, Nov. 1945, pp. 708-723, "Industrial Use of Radiation Pyrometers ..." by Harrison Radiation Pyrometry-Brochure of Milletron, Inc., Mar. 1966.

Primary Examiner—James J. Gill
Attorney, Agent, or Firm—Salvatore A. Giarratana; Edwin T. Grimes; Robert A. Hays

[57] ABSTRACT

A method and circuitry for maintaining the precise temperature of atomic absorption spectroscopy graphite specimen tubes over wide temperature ranges independently of the tube emission factor. The infrared radiation of a heated tube is measured by a detector, the signal from which is amplified in a variable gain amplifier, then compared with an externally generated "temperature select" signal, and the error signal therefrom controls a circuit that in turn controls the heating power to the graphite tube. A second measurement of the heated tube is made by a detector sensitive only to short wavelength radiation, e.g., visible, which is substantially unaffected by emission factors, and the signal therefrom adjusts the gain of the variable gain amplifier to thereby correct the infrared generated signal for variation in tube emission factors.

5 Claims, 8 Drawing Figures

PYROMETRIC TEMPERATURE MEASUREMENTS IN FLAMELESS ATOMIC ABSORPTION SPECTROSCOPY

CROSS-REFERENCE TO RELATED APPLICATIONS

The invention described and claimed herein is closely related to that described and claimed in copending patent application Ser. No. 890,731, filed Mar. 27, 1978 and assigned to the assignee of the present invention. That pending application covers improvements in measuring and controlling the very high temperatures developed in the graphite tubes used in analyses by atomic absorption spectroscopes and provides a means for determining tube temperatures with an accuracy that is independent of the tube emission factors that vary from tube to tube according to their wall thicknesses, composition, densities, etc. The present invention describes and claims improvements to that prior measuring system.

SUMMARY OF THE INVENTION

The temperature measuring system described and claimed herein is particularly suitable for automatically controlling the temperature of graphite tubes used in flameless atomic absorption spectroscopy and provides a radiation pyrometer calibration that is independent of the radiation emission factors of various graphite tubes used throughout the analytical processes.

In atomic absorption spectroscopic analyses, the specimen to be analyzed is placed in a graphite tube which is heated to a temperature sufficient to atomize the specimen. Some specimens are, of course, composed of a complex mixture of various substances or may contain impurities that are atomized at temperatures higher than the specimen atomizing temperature and it may be desired, therefore, to selectively atomize by heating the graphite tube to only a certain precise level.

Temperatures used in such spectroscopic analyses may vary from a very low temperature of perhaps 100° C. up to approximately 3,000° C. Infrared radiation detectors can accurately operate over this range but when directed to the external walls of the heated graphite tube, the temperature they observe is dependent upon the emission factor of the particular graphite tube. This emission factor varies from tube to tube and is dependent upon the particular characteristics of the tube, such as wall thickness, graphite density, composition of the tube, and the presence of other binding materials that go into the construction of the tube. An invention disclosed in pending application Ser. No. 890,731 recognizes that variations in emission factor are independent of graphite tube temperatures and discloses a method and circuitry for correcting a radiation detector reading to be independent of tube emission factors by use of a second calibrating detector, such as a thermocouple or the like, which is accurate and unaffected by emission factors but only over a very narrow temperature range. As the tube temperature is thus being increased for an analysis of a specimen, the radiation detector and calibration detector both measure the temperature. In the particular region where the calibration detector is accurate, its output is used to adjust a variable gain amplifier in the radiation detector circuit so that at elevated temperatures, the radiation detector output signal becomes corrected for the emission factor of that particular graphite tube. The copending application describes several different embodiments for correcting the signal from a radiation detector. In one embodiment the narrow range calibrating detector is a thermocouple that must be removed from the tube at higher temperatures to prevent its destruction. In another embodiment, a color pyrometer is used, and another embodiment includes a heating power meter.

As indicated above, a thermocouple calibrating detector must be removed from engagement with the graphite tube at higher temperatures to prevent its destruction and the mechanisms involved to accomplish this become somewhat awkward and cumbersome in actual practice. Further, the color pyrometer calibration detector is similarly complex in that it requires rotating colored filters and a signal processing circuit which provides a temperature output value from the signals representing two radiation wavelength values. The power measurement calibration detector disclosed in the prior pending application requires a relatively high temperature of about 2,300° C. or higher for operation, which is often much higher than the desired temperature for atomizing the specimen and furthermore reduces the useful life of the graphite tube.

It is the principal object of the present invention to provide a calibration temperature sensor which is simple, convenient to use, and which does not require the graphite tube to be heated to an undesirably high temperature.

This object is achieved by making the calibration temperature measurement of a particular graphite tube at or approaching the desired specimen atomizing temperature and during an absorption analysis. The calibration is made by a radiation detector that observes the heated tube through a suitable filter that passes a wavelength band, the center of which is shorter than the radiation wavelength emitted by the heated tube. The invention therefore makes use of the fact that the influence of emission factor on a temperature measurement is reduced with decreasing center wavelength of the radiation range utilized. For example, temperature measurements made in the visible range follow the equation:

$$\frac{1}{T} = \frac{1}{S\lambda} + \frac{\lambda}{C} \ln e_\lambda$$

wherein:
T = true temperature
$S\lambda$ = temperature measured at wavelength
$\lambda$ = center of wavelength used for calibration
$e_\lambda$ = emission factor of the graphite tube, and
C = a constant equal to 1.438 cm.-degrees In the above equation it can be seen that the term containing the emission factor also includes a wavelength term so that the influence of the emission factor becomes almost negligible at short wavelengths. Thus, for example, at a wavelength of 500 millimicrons and at a temperature, T, of 1,000° C., and an emission factor of 50%, the measured temperature, S, of 976° C. differs from the actual temperature by only 2.5%. Therefore, calibration temperature measurements using radiation of a short wavelength, preferably in the range of visible light, can be made with the required accuracy within a limited temperature range if the graphite tube emits sufficient radiation at the desired wavelength. During all absorption tests, the graphite tube which is well into the infrared range will emit sufficient radiation to be observed by a detector sensitive to the very short radiation wavelength.

Briefly described, the invention is for a means for measuring the temperature of a graphite tube heated to a limited temperature range in which the temperature can accurately be determined. This measurement is then used to calibrate another temperature measurement made over a wide infrared range but which, without such calibration, will vary from tube to tube depending upon the emission factors of the particular tube employed. The calibration temperature measurement is made at very short radiation wavelengths, such as in the visible light range where the effects of emission factors are negligible, and the detector output signal is used to adjust a variable gain amplifier in a servo control circuit. The amplifier receives input from the infrared detector, corrects the amplification for tube emission factors according to the measurements by the calibration detector, and applies its output to a differential circuit where it is compared with an externally generated "temperature select" control signal. The "error" output of the differential circuit is then used to accurately control the temperature of the graphite tube.

DESCRIPTION OF THE DRAWINGS

In the drawings which illustrate a preferred embodiment of the invention.

DETAILED DESCRIPTION

In atomic absorption spectroscopy, a specimen to be analyzed is heated to a point of vaporization and radiation beams at selected wavelengths are passed through the atomized vapor cloud and are detected on the opposite end to determine the amount of spectral absorption at the various wavelengths. Complex substances may thus be analyzed by selective vaporization by which the specimen may be heated to a certain temperature suitable for the analysis of various components but at a temperature below the vaporization level of other components or contaminants. Therefore, a precise control of the temperature of the specimen is required.

Figure 1:
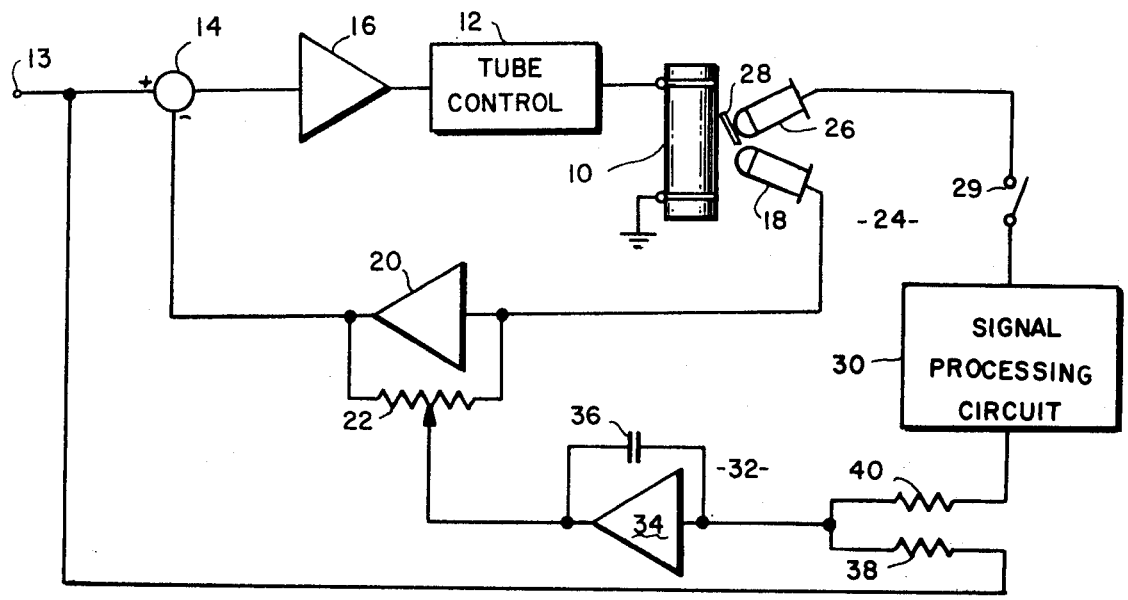
FIG. 1 is a schematic drawing illustrating the preferred embodiment of the invention along with its associated circuitry.

FIG. 1 is a schematic diagram illustrating a temperature control system for an atomic absorption spectroscope. The specimen to be analyzed is inserted into a graphite tube schematically illustrated at reference numeral 10. Tube 10 contains an electrode at each end, one of which is grounded, and the other of which is connected to a tube control 12 which controls the heating current through the tube 10. The desired temperature of tube 10 is externally selected and a D.C. signal is applied to the input terminal 13 and is mixed in the differential circuit 14 with a servo loop signal to be described. The output of the differential circuit 14 is an error signal representing a difference between signals of actual measured temperatures and the desired temperature. The error signal is then amplified at the preamplifier 16 and applied to the tube control 12.

As the graphite tube 10 is heated, the infrared radiation emitted therefrom is detected by an infrared detector 18 which is positioned with respect to the tube 10 to observe and measure the radiation emanating therefrom. The output of the detector 18 is amplified by a variable gain amplifier 20 and the signal therefrom is applied to the inverting terminal of the differential circuit 14 so that the difference between the input control signal at terminal 13 generates the required error signal. Thus, the infrared detector 18 and the differential circuit 14 provide a servo control loop that insures that the temperature of the graphite tube 10 will follow the externally selected temperature applied to the control input 13.

The infrared detector 18 can accurately determine the temperature of the graphite tube 10 over a wide range of temperatures. However, the radiation observed by the detector 18 is dependent upon variations that exist between various graphite tubes. For example, variations in graphite thickness, density, binders, etc., cause different tubes having identical interior temperatures to emit different amounts of infrared radiation. Thus, each tube has an emission factor which will affect the infrared radiation detected by detector 18 and therefore various graphite tubes having different emission factors will have different internal temperatures when detector 18 senses identical radiation from each.

As previously explained, the effects of emission factor are very greatly reduced in a detection system operating at very short wavelengths, for example, in the limited wavelength range of visible light. The invention therefore employs a detector that senses the radiation in the short-wavelength range that is substantially unaffected by varying emission factors, and utilizes the output from this limited range detector to control the amplification of the variable gain amplifier 20 so that all measurements made by the infrared detector 18 of FIG. 1 are corrected for variations in emission factor.

In FIG. 1, the limited range calibration measurement is made by a photoelectric detector 26 which is positioned to view the graphite tube through a suitable filter 28 which passes limited wavelength radiation in the range of relatively short wave light, for example 500 millimicrons. The output signal from the photoelectric detector 26, which is preferably a silicon diode, is applied through a switch 29 to a signal processing circuit 30 which provides a signal that represents the temperature of the graphite tube independently of the emission factor of the tube at least within a limited temperature range.

An integrating amplifier 32 having an operational amplifier 34 and a capacitor 36 in its negative feedback loop receives a signal formed by the difference between the externally generated control input signal at terminal 13 and the output of the signal processing circuit 30. The output of the signal processing circuit 30 is applied through a resistor 40 to the input of the amplifier 32 and the externally applied control signal is received, in opposition, through resistor 38. Thus, during the calibration mode with switch 29 closed, the difference of the external control input signal and the exact graphite tube temperature measured independently of the emission factor, is applied to the integrating amplifier 32. The output of the amplifier 32 controls the control element 22 of the variation gain amplifier 20. Once the calibration has been accomplished, switch 29 may thereupon be opened and the infrared detector 18 will continue to accurately control the temperature within the graphite tube 10, the amplification of the variable gain amplifier 20 being kept invariable.

Figure 2:
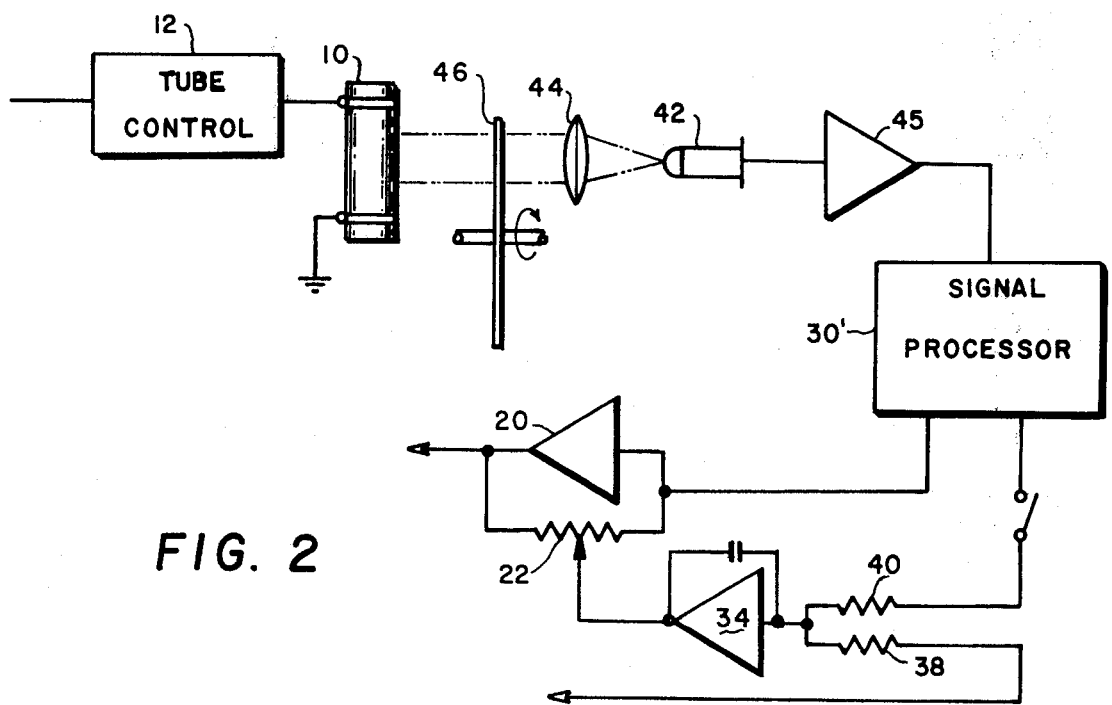
FIG. 2 is a schematic diagram of a second embodiment employing a single radiation detector for measuring both infrared tube temperatures and calibration temperature.
Figure 3:
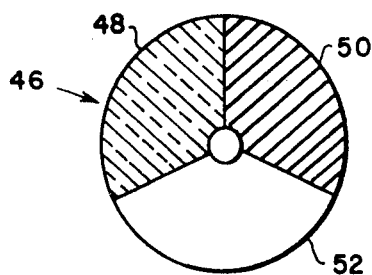
FIG. 3 is a schematic illustration of a filter and chopper wheel used in the embodiment illustrated in FIG. 2.

FIG. 2 is a schematic diagram of a second embodiment of the invention in which the radiation detector is a single element that senses both the infrared radiation from the graphite tube 10 and also the short wave or visible radiation necessary for calibrating the infrared measurement. In the embodiment of FIG. 2, a single radiation detector 42 is positioned to observe the radiation from the graphite tube 10 which is focused in the relatively narrow beam by means of a lens 44 which is preferably a potassium bromide or sodium bromide lens. A rotating filter and chopper wheel 46 is positioned in the beam between the graphite tube and the filter 44. The filter and chopper wheel 46, which is best illustrated in FIG. 3, contains three equal size sectors 48, 50 and 52 each extending through 120° of the disc 46. Sector 48 contains a filter which passes radiation in the infrared wavelength range and may, for example, be a germanium filter. The section 50 is opaque and the section 52 contains a filter which passes radiation only within a relatively shortwave optical wavelength range, such as in the visible range. When the filter and chopper wheel 46 rotates about its axis, the radiation detector 42 alternately receives cycles of no radiation, infrared radiation, and optical radiation, as best illustrated on the signal waveforms of FIG. 4.

Figure 4:
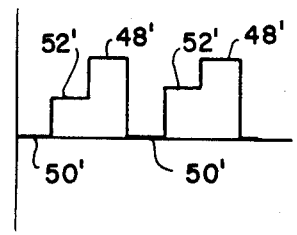
FIG. 4 is a diagram illustrating a typical output waveform signal from the radiation detector of FIG. 2.

In FIG. 4, the sections 50' represent areas of no radiation when the opaque section 50 of the wheel 46 is in the radiation path between the tube 10 and radiation detector 42. The section 52' represents the visible radiation output signal from detector 42 as the radiation beam passes through the shortwave filter 52 of FIG. 3; and the sections 48' of FIG. 4 represent the infrared output signal from detector 42 when the radiation beam passes through the infrared filter 48.

The signals generated by the radiation detector are suitably amplified by amplifier 45 and applied to a signal processor 30' which processes and demodulates the individual components in the detector output signal and directs the signal representing infrared measurements to the input of the variable gain amplifier 20. Signal processor 30' also directs the signal representing the correct temperature independent of the emission factor through resistor 40 and operational amplifier to the gain control element 22 of the amplifier in a manner similar to that described in connection with FIG. 1.

Figure 5:
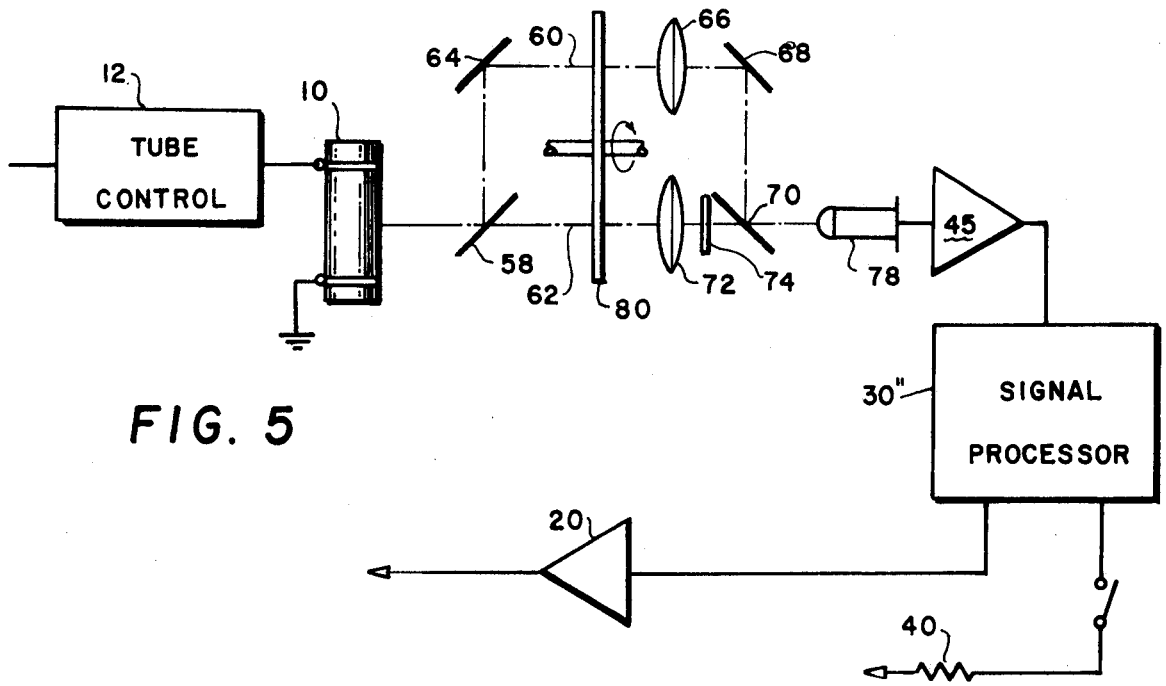
FIG. 5 is a schematic diagram illustrating another embodiment of the invention.
Figure 6:
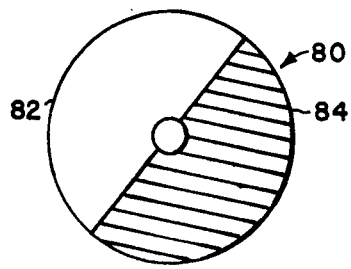
FIG. 6 is a schematic diagram of a chopper disc used in the embodiment of FIG. 5.

FIG. 5 is a schematic diagram of still another embodiment of the invention in which the radiation beam emanating from the graphite tube 10 is split into two partial beams 60 and 62 by means of a partially transparent mirror 58 which is designed to reflect approximately 80% of the radiation to a mirror 64 where the beam 60 is focused by a lens 66 which is preferably germanium. This infrared partial beam 60 is again deflected by a mirror 68 and is then re-combined with the partial beam 62 by means of a second partially transparent mirror 70. A glass lens 72 and a filter 74 that is transparent only in the optical range are located in the radiation path 62. Partial beams 60 and 62 re-combine in the partially transparent mirror 70 and impinge upon a single radiation detector 78. Interposed in the path of both radiation beams 60 and 62 is a chopper disc 80 having transparent and opaque semicircular sectors 82 and 84, respectively, as best illustrated in FIG. 6. Thus, as the chopper disc 80 rotates in the radiation path, the infrared radiation falls upon the detector 78 through the partial beam 60 while path 62 is blocked by the opaque sector 84 and thereafter, the optical radiation path 62 passes through the transparent sector 82 while the infrared radiation beam 60 is blocked by the opaque sector 84.

Figure 7:
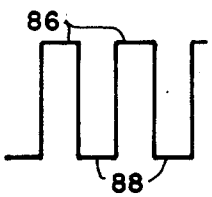
FIGS. 7 and 8 illustrate typical waveform signals from the radiation detector of FIG. 5 during periods of measurement and calibration, respectively.
Figure 8:
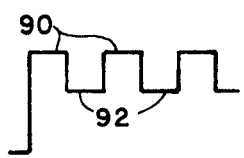

The output signal from the radiation detector 78 is illustrated in FIGS. 7 and 8. FIG. 7 illustrates the infrared response signal output of detector 78 with the amplitude peaks 86 representing the infrared temperature measurements of the graphite tube 10 and the zero amplitude sections 88 representing the periods during which the opaque sector 84 of the chopper 80 interrupt the beam 60. FIG. 8 illustrates the signal waveform at the radiation detector 78 during the calibration mode with the high amplitude sections 90 of the waveform representing the short or visible wavelength temperature measurement that is relatively unaffected by varying emission factors and the zero amplitude sections 92 of the waveform representing the periods during which the opaque section 84 of chopper 80 interrupt the beam 62. The signals illustrated in FIGS. 7 and 8 are amplified by a suitable amplifier 45 in FIG. 5 and applied to a signal processor 30'' which demodulates the square wave signals by known means and applies the D.C. output voltages obtained thereby to the variable gain amplifier 20 and through resistor 40 to the integrating amplifier as described in connection with FIG. 1.

Having thus described the invention, what is claimed is:

1. Circuitry for automatically adjusting the calibration of a first pyrometric radiation detector for extended temperature range measurements of a heated atomic absorption spectroscope graphite tube independently of the radiation emission factor of said tube, said first radiation detector being positioned to receive radiation from said tube and generating an output signal indicative of the temperature thereof, said circuit including:
   a variable gain amplifier coupled to said radiation detector and responsive to the signal generated therefrom;
   a second radiation detector positioned to sense the radiation emitted by said graphite tube, said second detector being accurate within a limited wavelength range and generating a second output signal that is independent of the emission factor of said graphite tube; and
   circuitry means responsive to said second output signal for adjusting the gain of said variable gain amplifier whereby the output signal of said amplifier represents the temperature sensed by said first radiation detector corrected for emission factor;
   the improvement comprising:
   said second radiation detector being sensitive to a limited radiation wavelength range, the center of which is a shortwave with respect to a radiation emitted by said graphite tube, said second detector including said first radiation detector and a short wavelength transmitting filter interposable in the radiation beam from said graphite tube.

2. The circuitry claimed in claim 1 wherein said second radiation detector is positioned to receive the radiation from said graphite tube through a filter that transmits only said limited shortwave length range.

3. The circuitry claimed in claim 1 wherein said second detector is sensitive to a limited wavelength range, the center of which is visible light.

4. The circuitry claimed in claim 3 wherein said second detector is a silicon diode.

5. The circuitry according to claims 1, 2, 3 or 4 further including heating control circuitry for the accurate control of temperature of said graphite tube in accordance with an externally generated temperature control input signal, said control circuitry including:

a differential circuit coupled to the temperature control input terminal and to the output of said variable gain amplifier, said differential circuit producing an output error signal proportional to the difference between said control input signal and said variable gain output signal; and tube control circuitry coupled to the output of said differential circuitry, the output of said tube control circuitry coupled to said graphite tube, said tube control circuitry varying the heating power to said graphite tube in accordance with said error signal.

* * * * *